United States Patent [19]

Campbell et al.

[11] 4,414,888
[45] Nov. 15, 1983

[54] BALING MACHINE WITH AIR SPRING MEANS FOR MAINTAINING APRON TENSION

[75] Inventors: Willis R. Campbell, Ephrata; Franklin A. Oellig, Leola, both of Pa.

[73] Assignee: Sperry Corporation, New Holland, Pa.

[21] Appl. No.: 333,204

[22] Filed: Dec. 21, 1981

[51] Int. Cl.³ .............................. B30B 5/02; B30B 5/06
[52] U.S. Cl. .................................. 100/88; 100/269 A; 56/341; 267/64.24
[58] Field of Search ............................ 100/88, 269 A; 56/341–343; 267/64.24, 64.27, 122; 198/813, 814, 955

[56] References Cited

U.S. PATENT DOCUMENTS 3,010,715 11/1961 Slemmons et al. ............... 267/64.24
3,901,007 8/1975 Blanshine et al. ..................... 100/88
4,257,219 3/1981 Burrough et al. ..................... 56/341

FOREIGN PATENT DOCUMENTS 634711 11/1978 U.S.S.R. ................................. 56/341
664,610 5/1979 U.S.S.R. ................................. 56/341

*Primary Examiner*—Peter Feldman
*Attorney, Agent, or Firm*—Darrell F. Marquette; Larry W. Miller; Frank A. Seemar

[57] ABSTRACT

A roll baling machine includes a frame, an apron supported on the frame for forming roll bales of crop material, and an arm assembly mounted on the frame supporting part of the apron. Air springs urge the arm assembly in a direction to maintain tension in the apron. Bar structures pivotally connect the air springs to the arm assembly, and bracket members rigidly connect the air springs to the frame.

2 Claims, 10 Drawing Figures

BALING MACHINE WITH AIR SPRING MEANS FOR MAINTAINING APRON TENSION

BACKGROUND OF THE INVENTION

This invention relates generally to baling machines typically referred to as "round balers" which form cylindrical roll bales of crop material.

In a conventional type of roll baling machine such as shown in U.S. Pat. No. 3,901,007, the upper apron moves from a starting position to a final position during formation of a roll bale in an expandable bale chamber. This movement of the upper apron is controlled by a mechanism that includes a rotatable arm assembly and extension coil springs. The arm assembly helps support the upper apron and rotates from a first position to a second position to allow the movement of the upper apron from the starting position to the final position as a bale is formed. The extension coil springs urge the arm assembly toward the first position while resisting movement thereof toward the second position. This maintains tension in the upper apron.

It is desirable for the tension in the upper apron to gradually increase during the initial and final stages of the bale forming process and to remain substantially constant during the intermediate stage of the bale forming process. This effectively controls the density of a roll bale during formation. In the baling machine shown in the above-mentioned patent, such variation in the upper apron tension is achieved by employing a rather complex arrangement of cam plates, cables and pulleys in combination with the extension coil springs which exert a constant force.

It is also desirable for the tension in the upper apron to be quickly and easily released for servicing the machine. In the baling machine shown in the above-mentioned patent, it is a difficult and lengthy procedure to release the tension in the upper apron because of the arrangement of cam plates, cables and pulleys used with the extension coil springs. Furthermore, these extension coil springs are difficult to remove from the machine because they are very bulky and heavy.

SUMMARY OF THE INVENTION

The present invention is intended for use on a roll baling machine having a frame, apron means supported on the frame for forming a roll bale of crop material, and an arm assembly mounted on the frame supporting part of the apron means. The arm assembly rotates from a first position to a second position during bale formation. Air spring means urge the arm assembly toward the first position while resisting movement thereof toward the second position in order to maintain tension in the apron means.

Specifically, the present invention provides first means pivotally connecting the air spring means to the arm assembly and second means rigidly connecting the air spring means to the frame. In the preferred embodiment, the air spring means includes an air bag for containing air under pressure and a piston movable into the air bag to increase the air pressure therein. The first means includes a bar member rigidly connected at one end to the piston and pivotally connected at the other end to the arm assembly. The second means includes a bracket member ridigly connected to the air bag and to the frame.

DESCRIPTION OF THE PREFERRED EMBODIMENT

Figure 1:
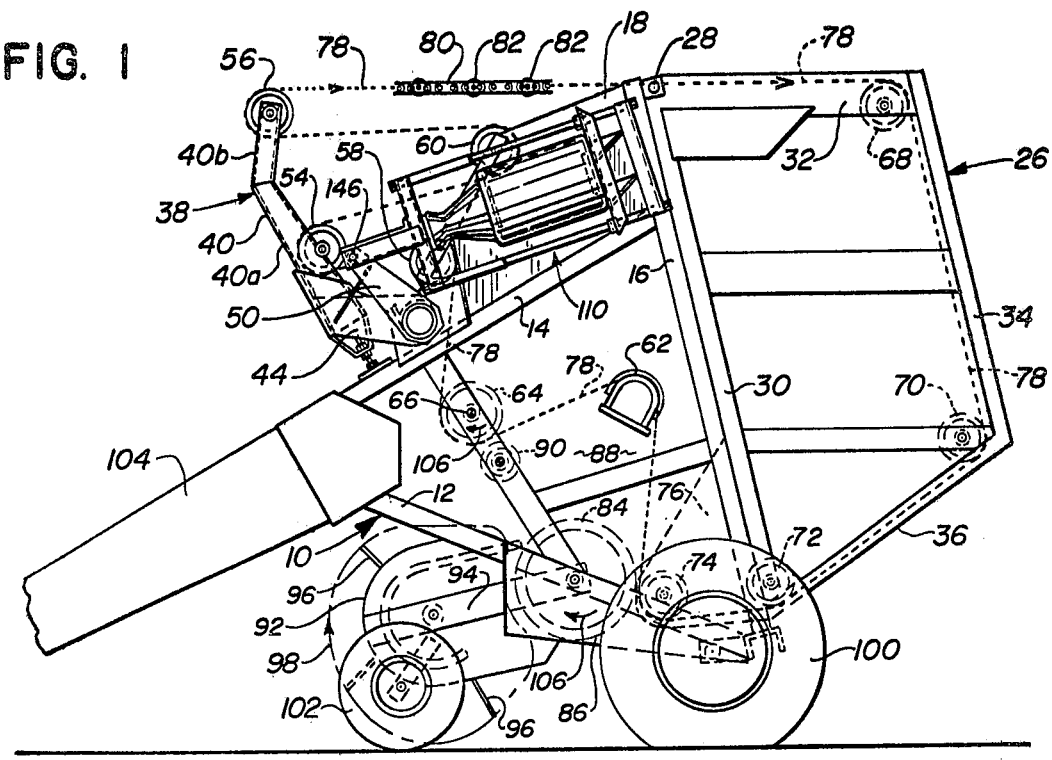
FIG. 1 is a side elevational view of a roll baling machine embodying the present invention taken when the machine is empty and the apron is in its starting position.
Figure 2:
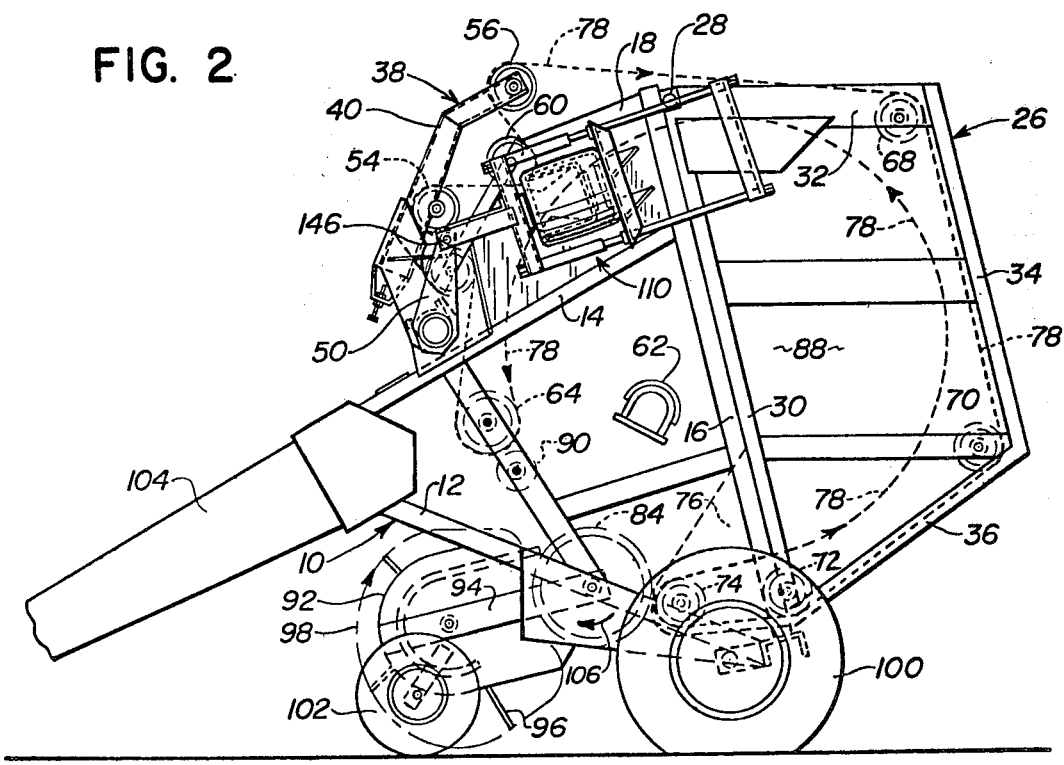
FIG. 2 is a side elevational view of the machine shown in FIG. 1 when a bale has been formed in the machine and the apron is in its final position.
Figure 3:
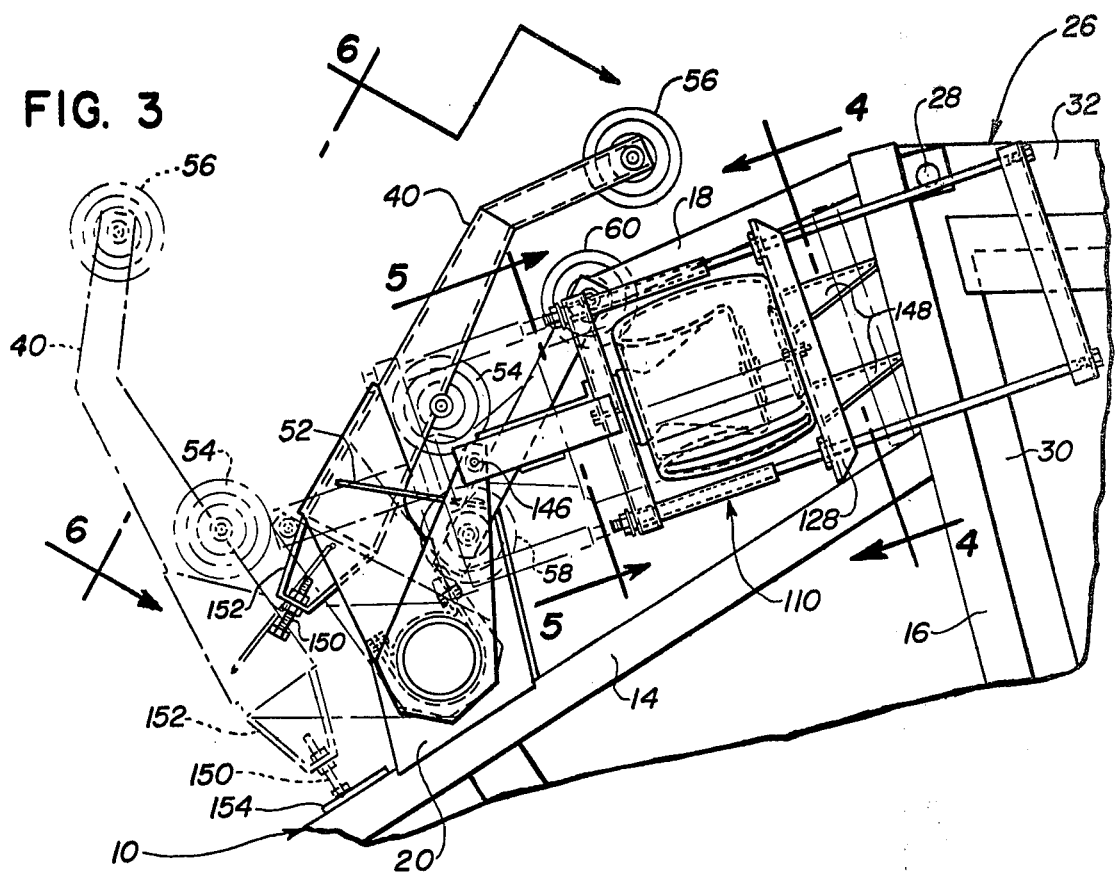
FIG. 3 is an enlarged view of a portion of the machine of FIGS. 1 and 2 showing the arm assembly and one of the air spring assemblies.
Figure 7:
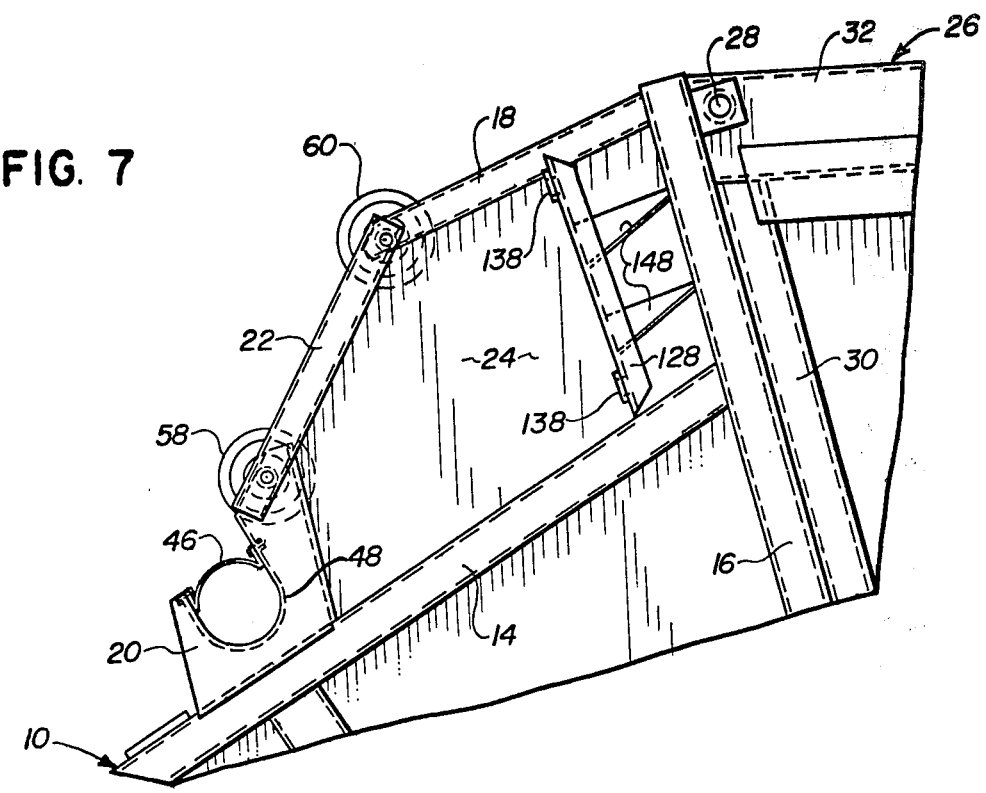
FIG. 7 is a view similar to FIG. 3 with the arm assembly and the air spring assembly removed.

Referring to FIG. 1, the roll baling machine embodying the preferred embodiment of the present invention includes a base frame 10 having opposite sides each formed generally of frame members 12, 14, 16 rigidly connected in a triangular configuration with side plates substantially covering the space therebetween. Each side of the base frame 10 includes an upper section, as best seen in FIG. 7, which consists of a frame member 18 rigidly connected to the frame member 16, a bracket 20 rigidly connected to frame member 14, and a frame member 22 rigidly connected between the frame member 18 and the bracket 20. A plate 24 is connected to and covers the space between the frame members 14, 16, 18 and 22. A rear frame 26 is pivotally connected at 28 to the base frame 10 by suitable bearings. The rear frame 26 has opposite sides each formed generally of frame members 30, 32, 34, 36 rigidly connected in a substantially trapezoidal configuration with side plates substantially covering the space therebetween. Other frame members (not shown) extend transversely of the machine and connect the opposite sides of the base frame 10 and the opposite sides of the rear frame 26. In FIGS. 1 and 2, the forward end of the machine is to the left and the rearward end thereof is to the right.

The rear frame 26 is pivotally movable from the lower position of FIG. 1 to an upper position (not shown) by conventional means such as hydraulic cylinders (not shown) mounted at the sides of the machine and connected between the base frame 10 and the rear frame 26.

Figure 6:
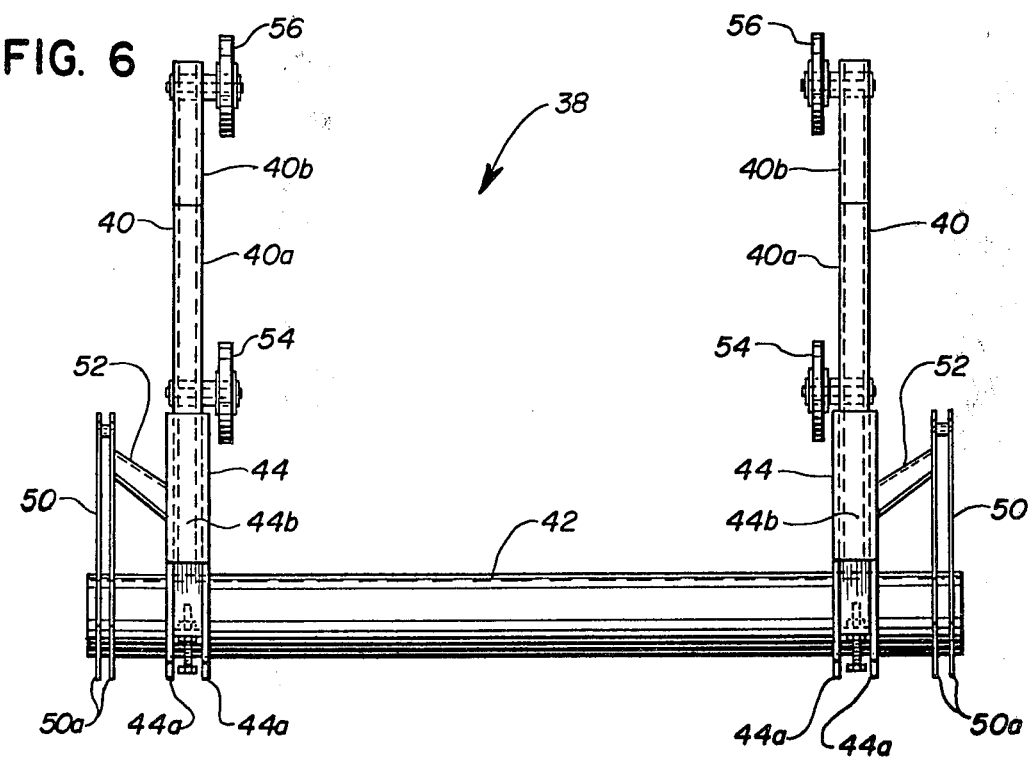
FIG. 6 is an enlarged plan view of the arm assembly taken along the lines 6—6 of FIG. 3.
Figure 9:
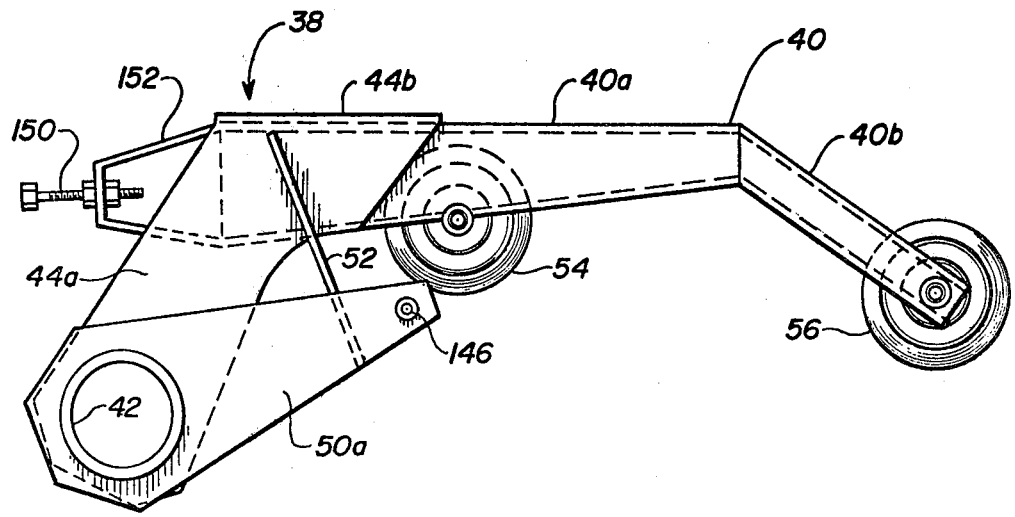
FIG. 9 is a side view of the arm assembly of FIG. 6.

An arm assembly 38 is rotatably mounted on the base frame 10 for rotational movement between a forward position shown in FIG. 1 and a rearward position shown in FIG. 2. The arm assembly 38, as also shown in FIGS. 6 and 9, includes arms 40 disposed inboard the sides of the machine. Each arm 40 consists of two portions 40a and 40b which are preferably box-shaped members of rectangular cross-section welded together. The arms 40 are rigidly connected to a cross tube 42 by bracket members 44. Each bracket member 44 includes a pair of flat plates 44a welded at one end to an arm portion 40a and having holes at the other end for receiving the cross tube 42. The flat plates 44a are welded to the cross tube 42. Each bracket member 44 also has a flat plate 44b connected between the flat plates 44a. The cross tube 42 is rotatably mounted in bearing members 46 and 48, best seen in FIG. 7, carried by the brackets 20 on the opposite sides of the base frame 10. The arm assembly 38 also includes auxiliary arms 50 disposed outboard the sides of the machine and rigidly connected to the cross tube 42. Each auxiliary arm 50 consists of a pair of flat plates 50a having holes at one end for receiving the cross tube 42. The flat plates 50a are welded to the cross tube 42. Braces 52 are connected between the bracket members 44 and the auxiliary arms 50.

The arm assembly 38 carries rotatable guide members 54 and 56 on its arm portions 40a and 40b, respectively. The base frame 10 supports rotatable guide members 58, 60 and cam guide members 62 inboard its opposite sides. Preferably, the cam guide members 62 are of the known type disclosed in U.S. Pat. No. 3,901,007 and designated therein by the numeral "118". Sprockets 64 are provided inboard the opposite sides of the base frame 10 and are fixed on a shaft 66 that is rotatably mounted in suitable bearings on the base frame 10. The rear frame 26 supports rotatable guide members 68, 70, 72, 74 inboard its opposite sides. The guide members 74 are carried on brackets 76 projecting from the frame members 30 of the rear frame 26.

A flexible bale forming apron 78 is movably supported on the aforementioned guide members and sprockets following the path shown in FIG. 1 when the machine is empty. The apron 78 is preferably formed of a pair of endless link-type chains 80 connected at spaced intervals by transverse bars or slats 82 as seen in partial view in FIG. 1. The apron chains 80 extend around and engage the various guide members and the sprockets 64. From the sprockets 64, the apron chains 80 extend upwardly around the guide members 58, 54, 60 and 56 in succession to dispose the part of the apron 78 supported by the arm assembly 38 in a substantially S-shaped configuration in side elevation. The guide members 58, 60 mounted on the base frame 10 engage the outer surfaces of the apron chains 80, and the guide members 54, 56 carried on the arm assembly 38 engage the inner surfaces of the apron chains 80. The apron 78 is of the known type disclosed in U.S. Pat. No. 3,901,007 and designated therein by the numeral "82".

A floor roller 84 extends transversely of the machine and is rotatably supported by brackets 86 on the opposite sides of the base frame 10. Preferably, the floor roller 84 consists of a hollow metal drum with a coating or layer of rubber on its outer surface. When the machine is empty as seen in FIG. 1, the upper surface of the floor roller 84 cooperates with the course of the apron 78 that extends upwardly and rearwardly from the guide members 74 over the cam guide members 62 and then downwardly and forwardly to the sprockets 64 to define an expandable bale chamber 88 having an initial wedge shape in side elevation. In this initial wedge shape, the forward end of the bale chamber 88 is narrower than the rearward end thereof. A stripper roller 90, preferably rubber coated, extends transversely of the machine and is rotatably supported on the opposite sides of the base frame 10. The stripper roller 90 is positioned at the forward end of the bale chamber 88 in close proximity to the apron 78.

A pickup header 92 extends transversely of the machine and is supported by brackets 94 on the opposite sides of the base frame 10. The pickup header 92 is preferably of conventional type having a series of projecting fingers 96 rotating in the path 98 for engaging and picking up windrowed crop material. A pair of wheels 100 mounted on the opposite sides of the base frame 10 support the machine. Another pair of wheels 102 are mounted to the brackets 94 to provide support primarily for the pickup header 92. A tongue 104 is provided on the forward end of the base frame 10 for connection to a tractor.

The machine includes drive means (not shown) adapted for connection to the power take off unit (PTO) of a tractor. Referring to FIG. 1, rotary driving power will be delivered from the tractor PTO in a manner to cause rotation of the sprockets 64, the floor roller 84, the stripper roller 90, and the pickup header fingers 96 in the same direction 106. Rotation of the sprockets 64 will drive the apron chains 80 thereby propelling the apron 78 around the various guide members in the base frame 10 and the rear frame 26 in the direction and along the path indicated. Preferably, the peripheral speed of the floor roller 84 should be equal to or slightly higher than the speed of the apron 78. This will tend to keep a roll of crop material toward the rearward end of the machine during formation.

Figure 5:
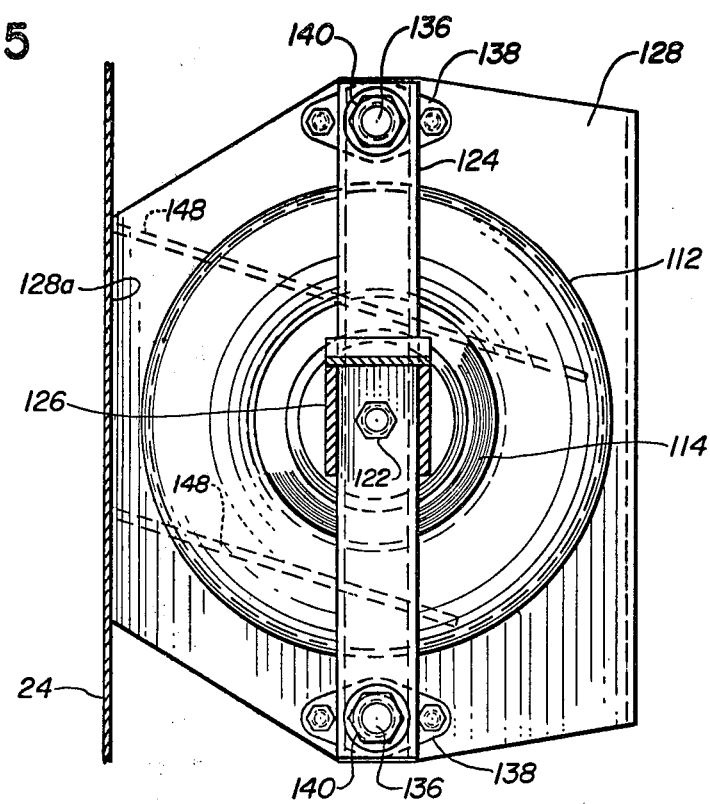
FIG. 5 is an enlarged sectional view taken along the lines 5—5 of FIG. 3.
Figure 8:
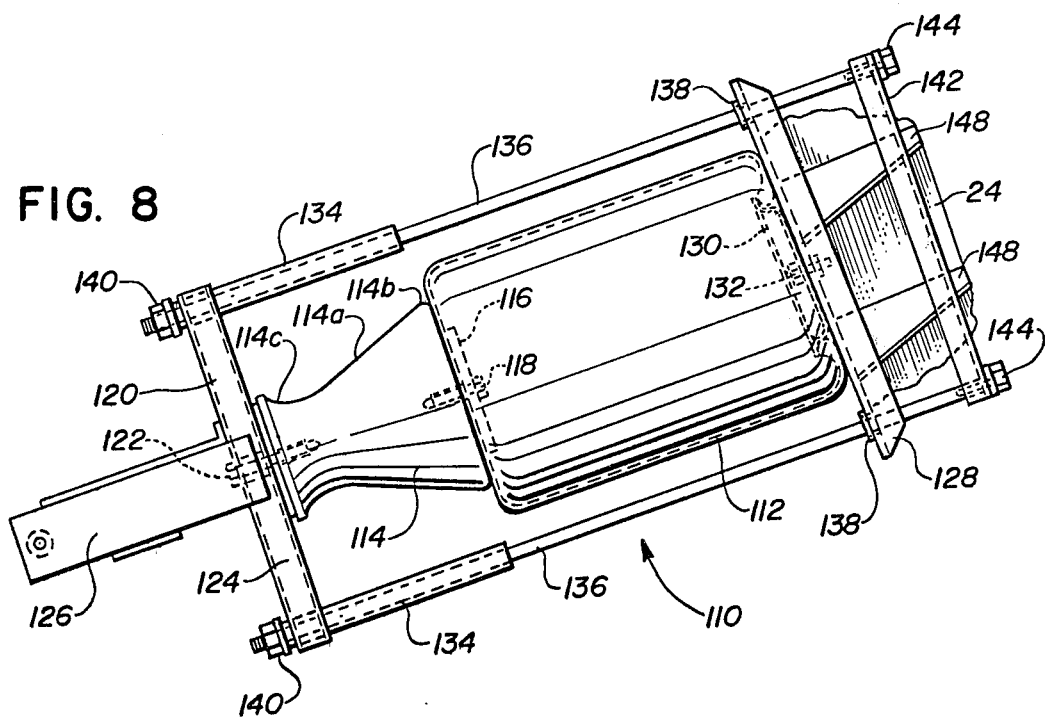
FIG. 8 is an enlarged side view of one of the air spring assemblies.

An air spring assembly 110 is connected between the arm assembly 38 and the base frame 10 at each side of the machine. Each air spring assembly 110, as best seen in FIG. 8, includes a generally cylindrical air bag 112, formed of resilient material such as rubber, and a generally frusto-conical piston 114 attached to the air bag 112 by a plate 116 and bolt 118 arrangement. The plate 116 is sealingly disposed inside one end of the air bag 112, and the bolt 118 extends through the plate 116 and is threaded into the larger end of the piston 114. A T-bar structure 120 is connected to the piston 114 by a bolt 122. The T-bar structure 120 is formed of bar members 124 and 126 which are welded together. The bar member 124 is generally rectangular in cross-section and the bar member 126 is generally U-shaped in cross-section as seen in FIG. 5. The bolt 122 extends through the bar member 124 and is threaded into the smaller end of the piston 114. A bracket 128 is connected to the air bag 112 by a plate 130 and bolt 132 arrangement. The plate 130 is sealingly disposed inside the other end of the air bag 112 opposite the plate 116, and the bolts 132 extend through the plate 130 and the bracket 128 and threadedly receive nuts. Tube members 134 extend through holes in the bar member 124 and are welded thereto. Guide rods 136 extend through the tube members 134 and through bearing members 138 mounted on the bracket 128 by bolts. The ends of the guide rods 136 extending through the tube members 134 threadedly receive nuts 140. The other ends of the guide rods 136 extending through the bearing members 138 are interconnected by a bar member 142 which is attached to the guide rods 136 by bolts 144.

The bar members 126 of the air spring assemblies 110 are pivotally connected by pins 146 to the auxiliary arms 50 of the arm assembly 38. The brackets 128 of the air spring assemblies 110 are rigidly connected along their edges 128a to the base frame plates 24 by conventional means such as welding. Braces 148 are connected between the brackets 128 and the base frame plates 24.

As the machine is pulled across a field by a tractor, the pickup header fingers 96 engage, pickup and deliver windrowed crop material onto the upper surface of the rotating floor roller 84 in the bale chamber 88. The crop material is carried upwardly and then coiled back downwardly onto itself by the apron 78 which in its starting position of FIG. 1 moves upwardly and rearwardly from the guide members 74 over the cam guide members 62 and then downwardly and forwardly to the sprockets 64. This movement of the apron 78 in the bale chamber 88 effectively starts the core of the roll bale. The rotating stripper roller 90 removes crop material from the apron 78 at the forward end of the bale chamber 88 and delivers it back downwardly into the bale chamber 88. The roll bale increases in diameter lifting the inner course of the apron 78 that extends between the guide members 74 and the sprockets 64 off the cam guide members 62, and expanding the bale chamber 88 from its initial wedge shape to a substantially circular shape. The expansion of the bale chamber 88 results in expansion of the inner course of the apron 78 contacting the peripheral surface of the roll bale and movement of the apron 78 toward its final position of FIG. 2. This movement of the apron 78 is accomplished by rotation of the arm assembly 38 in a clockwise direction as viewed in FIG. 1, from its forward position. When the bale reaches its maximum diameter, the apron 78 will be in its final position of FIG. 2 and the arm assembly 38 will have rotated about 65° to its rearward position shown in FIG. 2.

When the machine is empty, the arm assembly 38 is held in its forward position shown in FIG. 1 by the air spring assemblies 110. At this point, the air bags 112 each contain air under pressure (for example, between 50 and 60 psi) which acts on the larger ends of the pistons 114 attached thereto. Force is applied through the pistons 114 and the T-bar structures 120 to the auxiliary arms 50 of the arm assembly 38 thereby urging the arm assembly 38 toward the forward position of FIG. 1, while resisting rotation thereof toward the rearward position of FIG. 2. This maintains tension in the apron 78 by urging the apron 78 toward its starting position of FIG. 1 while resisting movement of the apron 78 toward its final position of FIG. 2. The arm assembly 38 is provided with stop bolts 150 carried by brackets 152 attached to the arms 40. The stop bolts 150 engage plates 154 attached to the frame members 14 of the base frame 10 to prevent counterclockwise rotation of the arm assembly 38 as viewed in FIG. 1 past the forward position.

Figure 10:
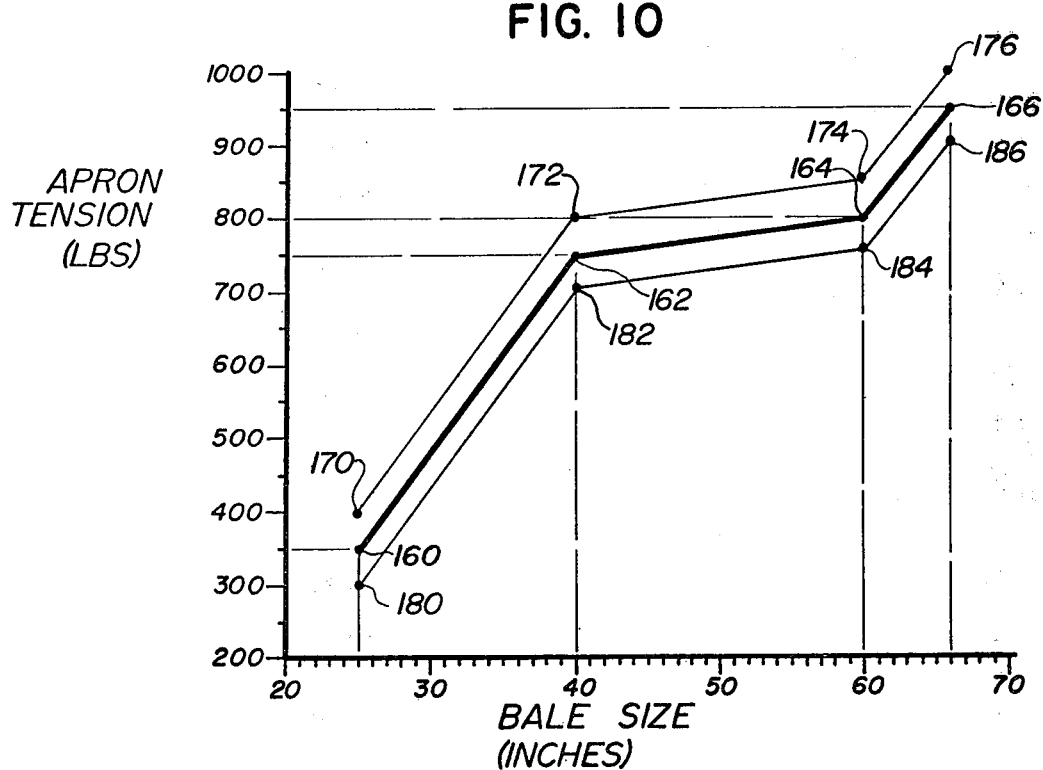
FIG. 10 is a graph comparing bale size and apron tension for the machine of FIG. 1.

As a bale is formed in the bale chamber 88, the arm assembly 38 is rotated from its forward position toward its rearward position shown in FIG. 2. This rotational movement of the arm assembly 38 causes the pistons 114 to be pushed into the air bags 112 decreasing the volume of the air bags 112 and further compressing the air therein. The force exerted through the pistons 114 and the T-bar structures 120 to the auxiliary arms 50 of the arm assembly 38 remains substantially constant during most of the rotational movement of the arm assembly 38 even though the air pressure in the air bags 112 increases. This is because the pistons 114 are conically tapered along their portion 114a in a manner which decreases the effective area of the pistons 114 acted upon by the air pressure in the air bags 112 as the pistons 114 penetrate the air bags 112 and increase the air pressure therein. Therefore, the tension in the apron 78 remains substantially constant during the intermediate stage of the bale forming process as generally represented by the line 162-164 in FIG. 10. During the initial and final stages of the bale forming process, the tension in the apron 78 gradually increases as generally represented by the lines 160-162 and 164-166, respectively, in FIG. 10. This is because the pistons 114 are formed along their portions 114b and 114c in a manner that increases the effective area of the pistons 114 acted upon by the air pressure in the air bags 112 as the pistons 114 penetrate the air bags 112, and thus gradually increases the force exerted through the pistons 114 and the T-bar structures 120 to the auxiliary arms 50 of the arm assembly 38. Therefore, the apron 78 effectively controls the density of a roll bale during formation and a roll bale of particular density is formed. If it is desired to form a bale of higher density, the air pressure in the air bags 112 is adjusted to a higher level (for example, between 70 and 80 psi) when the machine is empty and the arm assembly 38 is held in the forward position of FIG. 1. This results in higher tension in the apron 78 during bale formation as generally represented by the line 170-172-174-176 in FIG. 10, and a higher density bale is formed. If it is desired to form a bale of lower density, the air pressure in the air bags 112 is adjusted to a lower level (for example, between 40 and 50 psi) when the machine is empty and the arm assembly 38 is held in the forward position of FIG. 1. This results in lower tension in the apron 78 during bale formation as generally represented by the line 180-182-184-186 in FIG. 10, and a lower density bale is formed. It has been found that this adjustability of the air pressure in the air bags 112 provides a much wider range of apron tension and consequently a much wider range of bale density than is possible with the baling machine disclosed in U.S. Pat. No. 3,901,007.

Figure 4:
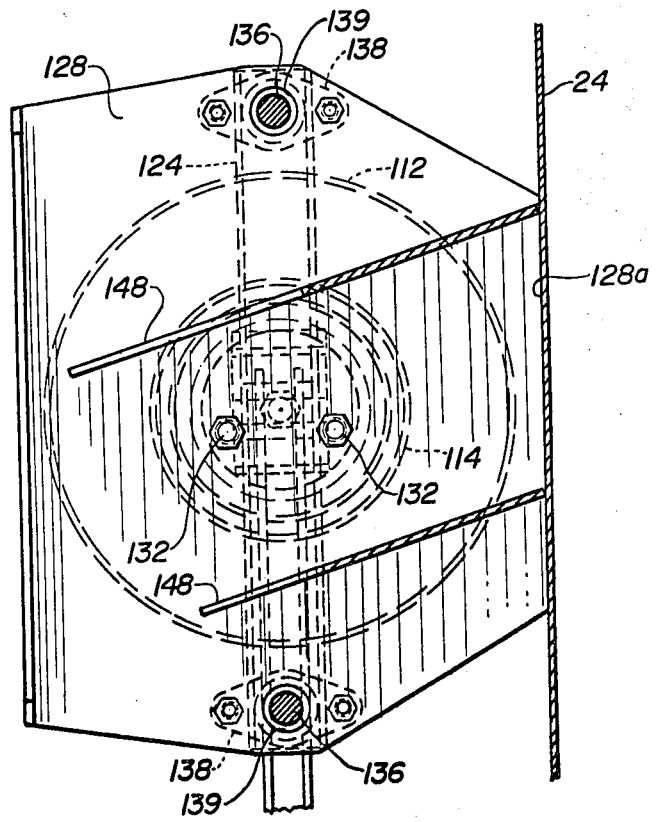
FIG. 4 is an enlarged sectional view taken along the lines 4—4 of FIG. 3.

As the pistons 114 are pushed into the air bags 112, the guide rods 136 slide through the bearing members 138 mounted on the brackets 128 and thus generally keep the pistons 114 aligned with the air bags 112. As seen in FIG. 4, the apertures 139 in the bearing members 138 are larger in diameter than the guide rods 136. This permits a slight rocking movement of the components of the air spring assemblies 110 with the exception of the brackets 128 which are rigidly attached to the base frame plate 24. With sufficient clearance between the apertures 139 in the bearing members 138 and the guide rods 136, there is no binding in the air spring assemblies 110 as the pistons 114 penetrate the air bags 112.

When the machine is empty and it is desired to service the various components such as the apron 78 and its guide members, the air pressure in the air bags 112 is reduced to a level where the force urging the arm assembly 38 toward its forward position is overcome by the weight of the apron 78. The apron 78 is then able to pull the arm assembly 38 from its forward position into its rearward position. This releases the tension in the apron 78 so that the various components of the machine may be easily serviced.

The present invention is not limited to use on roll baling machines that employ the particular type of apron 78. Accordingly, the present invention may be used on roll baling machines employing other types of aprons such as the well known type of apron formed of a series of endless flat belts.

The present invention is also not limited to use on roll baling machines that employ a roller type of floor. Accordingly, the present invention may be used on roll baling machines employing other types of floors such as the well known conveyor type of floor shown in U.S. Pat. No. 3,901,007.

The following claims are intended to cover all modifications and variations of the preferred embodiments of the invention without departing from the spirit and scope of the invention.

Having thus described the invention, what is claimed is:

1. In a roll baling machine having a frame, apron means supported on said frame for forming a roll bale of crop material, an arm assembly mounted on said frame supporting part of said apron means, said arm assembly rotating from a first position to a second position during bale formation, the improvement comprising:
   (a) air spring means urging said arm assembly toward said first position while resisting movement of said arm assembly toward said second position in order to maintain tension in said air spring means, said air spring means including an air bag for containing air under pressure and a piston movable into said air bag to increase the air pressure therein;
   (b) first means pivotally connecting said air spring means to said arm assembly, said first means including a bar member rigidly connected at one end to said piston and pivotally connected at the other end to said arm assembly;
   (c) second means rigidly connecting said air spring means to said frame, said second means including a bracket member rigidly connected to said air bag and to said frame;
   (d) guide rods connected to said bar member and extending through said bracket member; and
   (e) guide holes in said bracket member slidably receiving said guide rods, and the clearance between said guide rods and said guide holes being sufficient to allow rocking movement of said piston, said bar member and said guide rods as said arm assembly is rotated between said first and second positions.

2. The roll baling machine of claim 1 wherein said apron means comprises endless flexible members and transverse members extending between and interconnecting said endless flexible members.

* * * * *